United States Patent
Reuter et al.

[11] Patent Number: 5,603,483
[45] Date of Patent: Feb. 18, 1997

[54] SOLENOID VALVE

[75] Inventors: David F. Reuter; William D. Cornwell, both of Beavercreek; Viswanath Seetharaman, Fairborn, all of Ohio

[73] Assignee: General Motors Corporation, Detroit, Mich.

[21] Appl. No.: 570,025

[22] Filed: Dec. 11, 1995

[51] Int. Cl.⁶ .............................. F16K 1/44; F16K 31/06
[52] U.S. Cl. .............................. 251/129.02; 251/129.15; 251/210; 303/119.2
[58] Field of Search ................ 251/129.02, 129.15, 251/210; 303/119.2

[56] References Cited

U.S. PATENT DOCUMENTS

| | | | |
|---|---|---|---|
| 2,692,750 | 10/1954 | Davis et al. | 251/210 |
| 3,071,344 | 1/1963 | Banks | 251/210 |
| 4,506,859 | 3/1985 | Schmidt et al. | 251/210 X |
| 5,267,785 | 12/1993 | Maisch | 303/119.2 |
| 5,409,304 | 4/1995 | Goossens | 303/119.2 |
| 5,462,253 | 10/1995 | Asthana et al. | 251/121 |
| 5,476,243 | 12/1995 | Oehler et al. | 251/129.02 X |
| 5,503,184 | 4/1996 | Reinartz et al. | 303/119.2 X |

*Primary Examiner*—Gerald A. Michalsky
*Attorney, Agent, or Firm*—Jeffrey A. Sedlar

[57] ABSTRACT

A normally open solenoid valve is provided for brake system operation which includes a poppet utilizing a spherical end in conjunction with a valve seat to provide the primary control orifice of the valve. A sleeve is inserted into the main body of the valve with an annular edge provided on the poppet near the spherical end which operates in conjunction with the sleeve to provide a secondary control orifice downstream of the primary control orifice.

6 Claims, 3 Drawing Sheets

TO WHEEL BRAKE

SOLENOID VALVE

BACKGROUND OF THE INVENTION

The present invention relates to solenoid valves and more particularly, to a solenoid valve that exhibits a dynamic force field distribution with effectively eliminated negative flow forces, suitable for use in vehicular anti-lock braking systems.

Numerous varieties of solenoid valves are conventionally available, many of which are constructed for use in specific applications. Two-way solenoid valves are widely used and are generally provided in either a normally closed or a normally open configuration. Such valves are conventionally used in anti-lock braking and related systems wherein two solenoid valves per wheel or more specifically, two solenoid valves per ABS control channel are typically used. The valve pairs are usually arranged as one normally open and one normally closed. The normally open valve typically resides between the wheel brake and the master cylinder and the normally closed valve generally resides between the wheel brake and the recirculation pump inlet.

Such a paired solenoid valve arrangement provides control of the wheel brake for pressure modulation purposes. Typically, the wheel brake pressure may be independently reduced, held at an intermediate pressure, or reapplied up to the master cylinder pressure. In order to control the rate at which the pressure builds or decays in the wheel brake, the solenoid valves are typically pulsed open and closed in a very rapid fashion in order to effectively control the flow rate of fluid either to or from the wheel brake.

To effectively control flow rates in a precise manner, solenoid valves used in braking systems respond quickly to control signals. Typical solenoid valves can fully open or fully close in milliseconds. An aspect of this fast response characteristic is that it results in the rapid acceleration and deceleration of the high velocity fluid flowing through the small ports in the valves.

It has been discovered as part of the present invention that, particularly with the normally open solenoid valve, this phenomenon causes a localized pressure pulse within the valve which subsequently travels down the entire column of hydraulic fluid that connects the solenoid valve in the ABS modulator to the master cylinder. Upon reaching the master cylinder, this pressure pulse can excite audible noise and vibrations. Although these results do not effect the operational characteristics of the braking system they may be perceivable and therefore, are generally considered as undesirable.

SUMMARY OF THE INVENTION

According to an aspect of the present invention a solenoid valve is provided which includes a moving element that operates in providing combined primary orifice control in a poppet valve manner and secondary orifice control in a spool valve manner. According to this aspect the valve provides an improvement over the noise and vibration generation characteristics of conventional valve constructions.

A solenoid valve according to this aspect includes a housing with a longitudinal bore and a cross bore intersecting the longitudinal bore. A valve sleeve is positioned in the longitudinal bore at its point of intersection with the cross bore. A valve seat is formed about a primary control orifice by the housing in the longitudinal bore adjacent the sleeve. The valve sleeve preferably has one or more cross holes formed as cross-drilled openings or optional milled slots which are accurately positioned along the axial length of the valve sleeve. The relative size and positioning of the holes is selected for each specific application. A poppet rod with a preferred parti-spherical end operates in conjunction with the valve seat to provide a fluid tight seal at the primary control orifice. An annular edge or "step" is provided on the poppet rod that operates in conjunction with the cross hole of the sleeve to selectively open and close the valve at the secondary control orifice. The location of the annular edge and the amount of popper-to-hole overlap are specifically selected to provide a preferred force field distribution on the valve.

FIG. 6 illustrates the forced field distribution that has been determined to be generated during closure of a normally open solenoid valve poppet 7 of conventional construction. It has been observed that as high pressure brake fluid flows in from the master cylinder through the sole, relatively small control orifice, past the base of the poppet 7 and out to the wheel brake through the side ports, a force field develops on the face of the poppet from the prevailing flow forces.

It has been determined that this field includes positive force vectors 8 in the flow direction as would generally be expected. In addition, it has been determined that the field consists of negative force vectors 9 opposing the flow direction. Particularly significant are negative flow forces which result from high velocity flow around the popper radius, which results in significantly reduced localized pressure in that area. These flow forces vary as the valve moves and the area of the flow path changes.

It has also been found that a valve according to aspects of the present invention provides a greater degree of linearization of flow control from pulsed current inputs. Linearization results from substantial elimination of the negative force vectors as exhibited by the operational characteristics of a conventional solenoid valve used in braking systems as illustrated in FIG. 6. The present invention provides this result through the creation of a back pressure provided by partially closing the secondary control orifice.

The operating principle of a solenoid valve according to the present invention additionally provides a relatively slow closing rate as is typically associated with a ported spool-type valve combined with a low leakage and low cost characteristics of a poppet valve. As the solenoid valve is signaled to move from an open to a closed position, the poppet rod begins to move towards the valve seat. The annular edge on the poppet rod immediately begins to throttle flow through the cross hole, with the incremental area being closed decreasing as a function of poppet rod travel. Immediately prior to engagement of the poppet rod with the valve seat, flow is effectively stopped through the cross hole except for the small amount of leakage between the poppet rod and the valve sleeve. This provides for a solenoid valve with a smooth, quiet flow cessation characteristic minimizing noise generation effects of conventionally known solenoid valves. Optionally, increased balancing is effected by the addition of pressure equalization slots along the exterior of the valve sleeve.

As a solenoid valve according to the present invention is closed, flow is throttled at the secondary control orifice rather than at the primary control orifice where the final closure of the valve is effected by the end of the poppet rod. By throttling flow downstream of the primary control orifice a secondary pressure drop is introduced in the valve as it closes. The back pressure created in the flow path is sufficient to substantially eliminate the negative flow forces that are conventionally present on the end of a typical solenoid valve's poppet.

Valve flow rates as a function of step input electrical current pulses are consistent. In addition, the hydraulic flow corresponding to a given pulse pattern remains consistent throughout the entire operating pressure range of the solenoid valve. The reduced rate of closure substantially minimizes the noise conventionally present with solenoid valve operation since there is less instantaneous flow present at the moment of total poppet closure. It has been found that noise effects measurable as "G-forces" transmitted to the master cylinder, have been reduced by approximately 30 percent.

DETAILED DESCRIPTION OF THE PRESENTLY PREFERRED EMBODIMENTS

Figure 1:
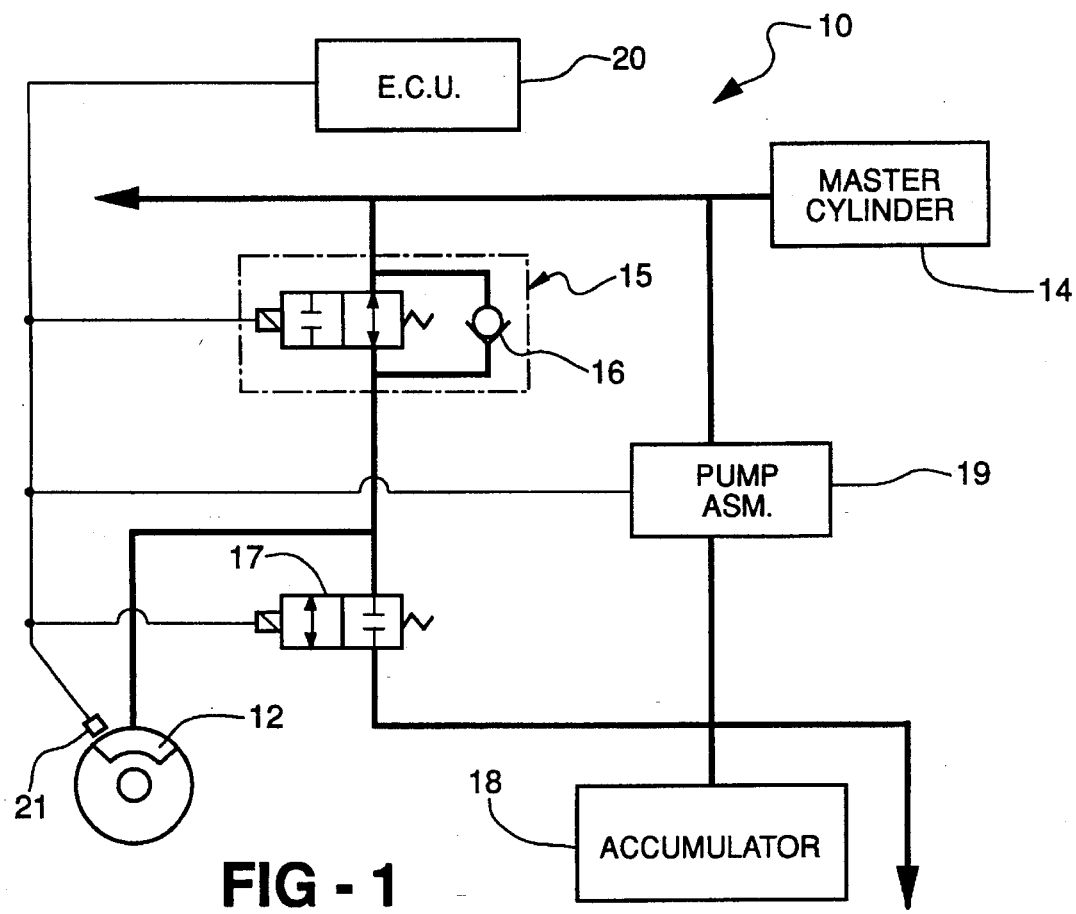
FIG. 1 is a diagrammatic illustration of a brake system utilizing solenoid valves.
Figure 6:
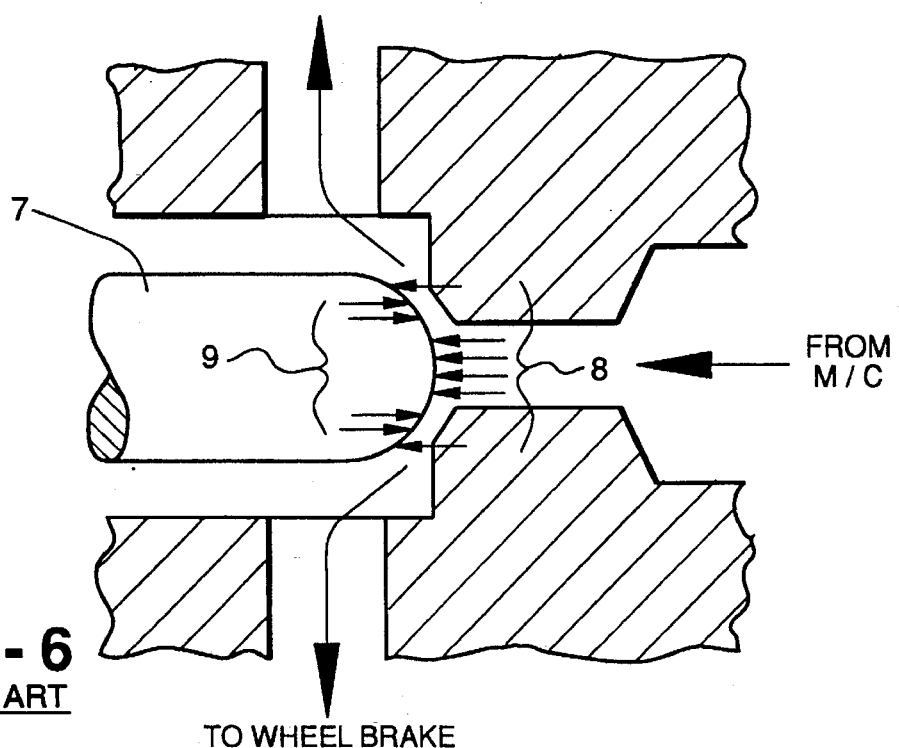
FIG. 6 is a prior art illustration of the force field distribution on a conventional single control orifice poppet valve.

Referring to the drawings, diagrammatically illustrated in FIG. 1 is that portion of a brake system 10 for providing ABS control of one wheel brake 12. Master cylinder 14 is connected to wheel brake 12 directly through normally open solenoid valve 15 providing a normally open path containing a column of fluid for base brake operation. A normally closed solenoid valve 17 is connected in the brake system 10 between the wheel brake 12 and the accumulator 18 on the inlet side of the pump assembly 19. The normally open solenoid valve 15 includes an integral check feature 16 to provide a consistently openable flow path between the wheel brake 12 and the master cylinder 14 for relieving wheel brake pressure when the master cylinder 14 is de-actuated.

An electronic control unit 20 is provided that communicates with normally open solenoid valve 15, normally close solenoid valve 17, pump assembly 19 and wheel speed sensor 21. The ECU 20 responds in a pre-programmed manner to inputs from wheel speed sensor 21 and other sensed vehicular operational characteristics to control the brake system 10 providing control functions such as ABS. The pump assembly 19 is selectively controlled to provide a pressure source at its outlet and to draw fluid at its inlet. The normally open solenoid valve 15 and the normally close solenoid valve 17 are selectively energized and rapidly respond to alter the available flow paths through the brake system 10.

By way of example, when an incipient lock-up condition is sensed by wheel speed sensor 21 and communicated to ECU 20, the pump assembly 19 is immediately energized, the normally open solenoid valve 15 is closed and the normally closed solenoid 17 is opened. In response, the application of brake fluid pressure from the master cylinder 14 to the wheel brake 12 is interrupted, stopping movement of the column of fluid that exists therebetween, and permitting movement of fluid from the wheel brake 12 to the accumulator 18 on the inlet side of pump assembly 19. This provides a means of relieving fluid pressure at the wheel brake 12 and avoiding a lock-up condition.

As pressure is sufficiently reduced at the wheel brake 12 to avoid lock-up, the selected actuation of master cylinder 14 may be such that it is necessary to maintain or increase the fluid pressure at wheel brake 12. In response, the normally closed solenoid valve 17 is deenergized and thus closed maintaining the pressure level at wheel brake 12.

Additionally, in response to sensed inputs, the ECU 20 may determine in a preprogrammed manner that it is necessary to increase fluid pressure at wheel brake 12 and therefore, deenergize the normally open solenoid valve 15 to permit a fluid pressure increase by the pump assembly 19. As a result of the operational functioning of the brake system 10, the normally open solenoid valve 15 and the normally close solenoid valve 17 are cycled in rapid succession between open and closed positions.

Figure 2:
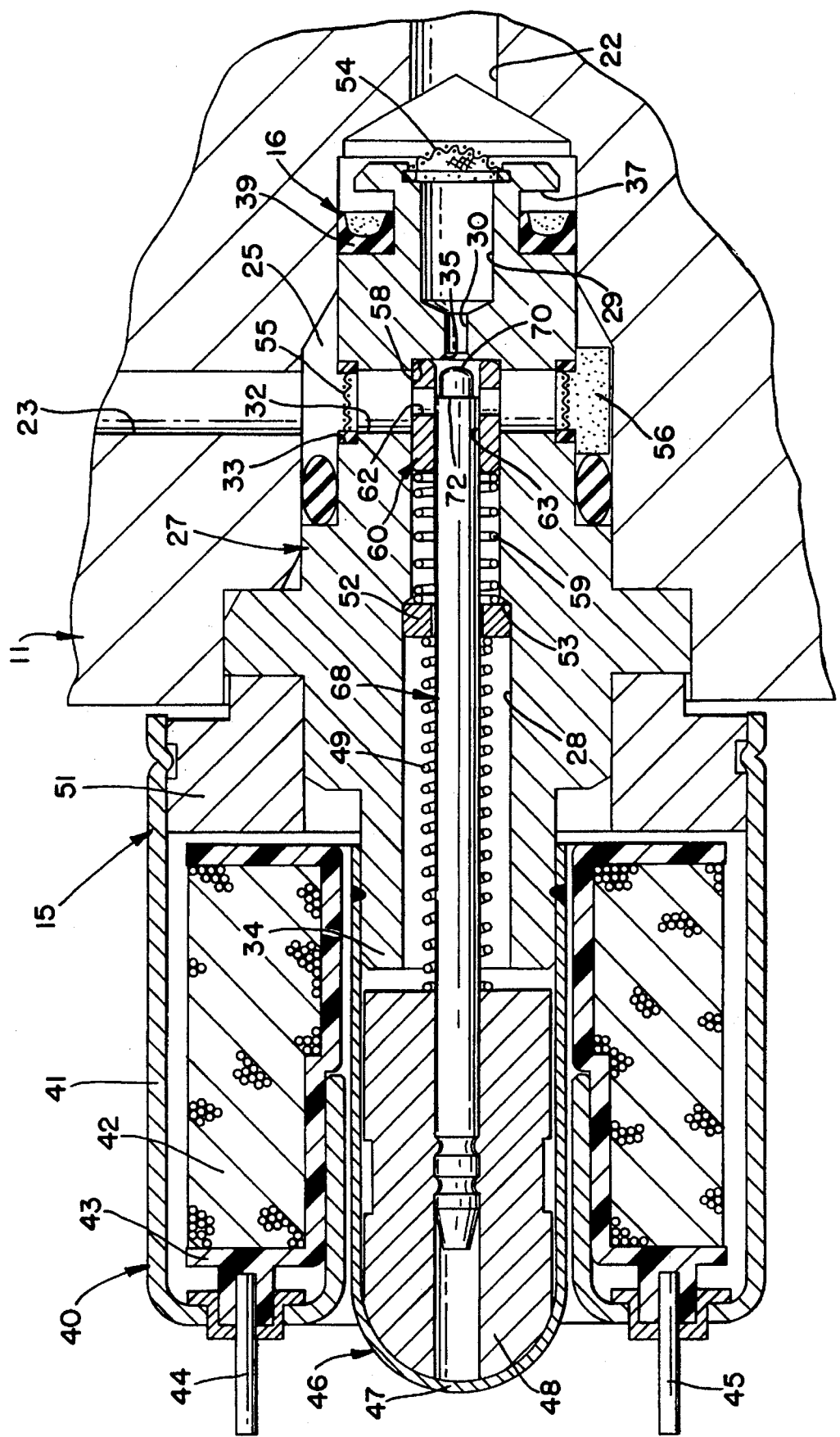
FIG. 2 is a fragmentary cross sectional illustration of a brake module including a solenoid valve.

Referring to FIG. 2, the normally open solenoid valve 15 is illustrated in greater detail. Solenoid valve 15 is installed in module 11 with port 22 leading to master cylinder 14 and port 23 leading to wheel brake 12 as shown in FIG. 1. Ports 22 and 23 communicate with cavity 25 of module 11.

The solenoid valve 15 includes a housing 27 that is received within the cavity 25. Housing 27 includes a longitudinal opening that is made up of longitudinal stepped bore 28, bore 29 and primary control orifice 30 which connects the two bores 28 and 29. A cross bore 32 also extends through housing 27 and intersects the stepped bore 28 near its point of communication with the primary control orifice 30. An annular groove 33 is formed in the housing 27 at the cross bore 32. Housing 27 integrally forms valve seat 35 about the primary control orifice 30 on the side of stepped bore 28.

Housing 27 also includes an annular groove 37 that carries a seal 39. Seal 39 contacts the wall of cavity 25 between the ports 23 and 22. Together the seal 39 and the wall of cavity 25 provide the one-way check valve 16 between the ports 22 and 23.

The housing 27 supports a solenoid actuator 40 about annular end 34. The actuator 40 includes frame 41 that is crimped onto an annular plate 51 which mates with the housing 27. Frame 41 carries coil 42 that is comprised of a plurality of turns of wire wound on a bobbin 43. A pair of terminal pins 44 and 45 are provided in contact with the coil 42 and extend through the frame 41.

An actuator sleeve 46 of nonmagnetic material extends through the center of coil 42 and sealingly bears against the housing 27 over the annular end 34. Actuator sleeve 46 includes a closed end 47 and provides a bearing surface for the armature 48 operating to maintain the radial positioning of the armature 48 and to maintain a relatively small secondary air gap between the frame 41 and armature 48. An annular spring support 52 is located in stepped bore 28 against step 53 and provides a bearing surface for return spring 49 that operates to bias armature 48 toward the closed end 47 of actuator sleeve 46.

The flow path through the valve 15 between the ports 22 and 23 extends through bore 29, primary control orifice 30, valve seat 35, stepped bore 28, cross bore 32 and annular groove 33. A pair of filters 54 and 55 are provided at the ports 22 and 23 respectively, to prevent the transmission of contaminants into the valve 15. Filter 55 includes a plastic frame with a plurality of radially extending legs represented by leg 56 that extends toward module 11.

A valve sleeve 60 is interposed in the flow path through the valve 15 in stepped bore 28 against shoulder 58. The valve sleeve 60 includes a cross hole 62 which intersects a longitudinal hole 63 and through which flow between the ports 22 and 23 must pass. The longitudinal hole 63 is disposed coaxially with stepped bore 28 and communicates with the primary control orifice 30 through valve seat 35. The cross hole 62 resides in communication with cross bore 32. Valve sleeve 60 is optionally biased against shoulder 58 by spring 59 which bears against spring support 52 to minimize press fit requirements of sleeve 60.

Figure 3:
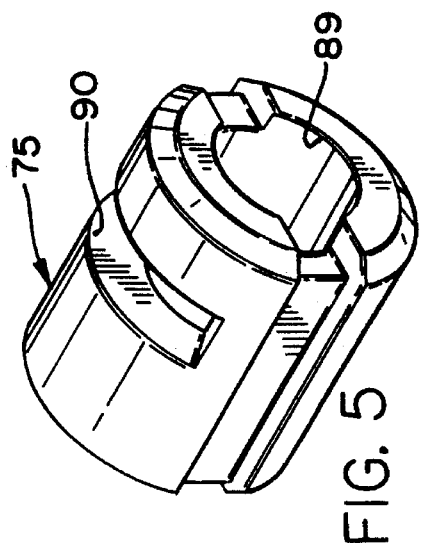
FIG. 3 is a perspective view of the valve sleeve of the solenoid valve illustrated in FIG. 2.

Referring to FIG. 3, the valve sleeve 60 is illustrated in perspective. In addition to the cross hole 62 and longitudinal hole 63 the valve sleeve 60 includes an optional end groove 64 and an optional longitudinal groove 65. Together the grooves 64 and 65 provide for pressure compensation across the valve sleeve 60 within the stepped bore 28 ensuring that fluid pressure equalizes between the front side and the back side of the sleeve 60 during closure of the valve 15. Therefore, the magnetic force required to close the solenoid actuator 40 does not have to overcome the increased force created by otherwise entrapped fluid on the front side of the sleeve 60 in longitudinal hole 63 near valve seat 35.

Armature 48 includes a rod 68 that extends through spring 49, spring support 52, spring 59 and into valve sleeve 60. The rod 68 includes a partispherical end 70 for selected engagement with the valve seat 35 and an adjacent turned down area forming a step with annular edge 72. This construction results in a dual action valve wherein parti-spherical end 70 operates in combination with valve seat 35 to open and close the flow path between longitudinal hole 63 and primary control orifice 30 and wherein annular edge 72 operates in conjunction with cross hole 62 to open and close the flow path between longitudinal hole 63 and cross bore 32.

When the normally open valve 15 is moved to a closed position by means of the actuator 40 acting upon armature 48, initially the annular edge 72 begins to throttle flow by progressively closing off the cross hole 62 as the parti-spherical end 70 moves towards the valve seat 35. The area of the cross hole 62 is closed off incrementally by the annular edge 72 and final closure of the valve is provided by engagement between the valve seat 35 and the partispherical end 70.

Immediately prior to engagement between the valve seat 35 and the parti-spherical end 70, the cross hole 62 is completely closed off by the annular edge 72 and therefore, the only flow remaining through the valve is that which exist due to leakage between the rod 68 and the longitudinal hole 63. The leakage flow rate does not have a significant effect in noise generation when the primary control orifice 30 is completely closed and provides for pressure balance during the last portion of travel of the rod 68 as the valve closes. This provides for smooth quiet shut off characteristic for the valve 15.

By throttling flow at the interface between the annular edge 72 and the cross hole 62 at a point downstream from the primary control orifice at the valve seat 35, a secondary pressure drop is introduced in the valve 15 as it closes. The resultant back pressure created between the two points substantially eliminates negative forces that would otherwise be present on the parti-spherical end 70 of the rod 68.

Figure 4:
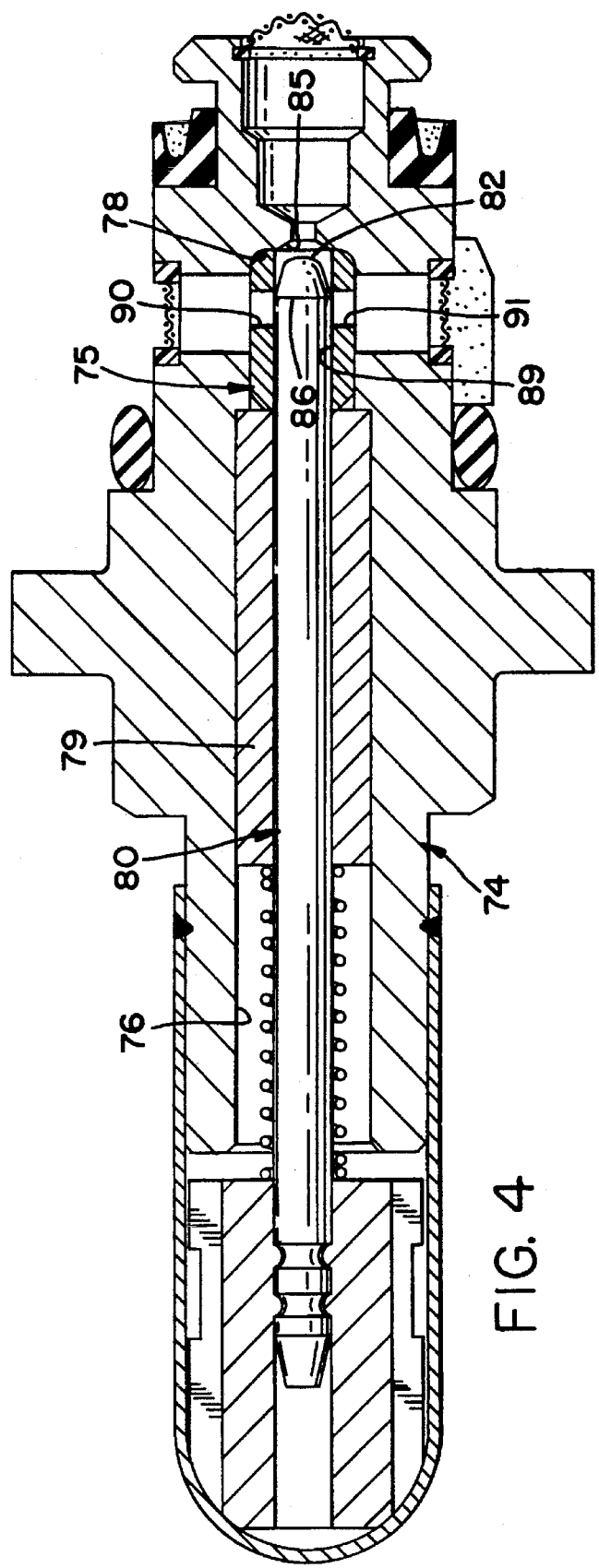
FIG. 4 is a fragmentary cross sectional illustration of a solenoid valve according to an alternate embodiment of the present invention.

Referring to FIG. 4, an alternative embodiment of the present invention is illustrated. The valve sleeve 75 is pressed into the stepped bore 76 eliminating a need for a spring to bias the valve sleeve 75 against the shoulder 78. An elongated spring support 79 is provided which acts to guide the rod 80 along a significant portion of its length. The rod 80 includes a parti-spherical end 82 that operates in conjunction with valve seat 85 to provide the primary control orifice of the valve 74. The area of the rod 80 adjacent parti-spherical end 82 is tapered outward to the diameter of the rod 80 at annular edge 86.

Figure 5:
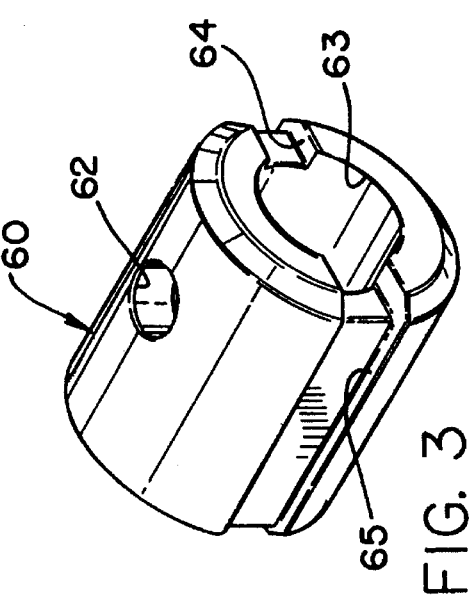
FIG. 5 is a perspective illustration of the valve sleeve of the solenoid valve illustrated in FIG. 4.

Valve sleeve 75 is illustrated in perspective in FIG. 5 and includes a pair of slots 90 and 91 as cross holes which communicate with the longitudinal hole 89. The slots 90 and 91 provide greater area for increased base brake fluid flow when required. The annular edge 86 of rod 80 operates in conjunction with the slots 90, 91 to provide a secondary control orifice downstream of the primary control orifice provided by the parti-spherical end 82 in combination with the valve seat 85. The operation of the valve 74 is substantially the same as the valve 15 as described in relation to FIGS. 1–3.

What is claimed is:

1. A solenoid valve comprising:
    a housing having a longitudinal bore including a step and a valve seat formed by a localized narrowing of the longitudinal bore at an orifice and having a cross bore intersecting the longitudinal bore near the valve seat, the housing including an annular end;
    an actuator carried on the annular end of the housing including an armature and an actuator sleeve with a closed end guideably carrying the armature with a rod extending from the armature substantially through the longitudinal bore including a parti-spherical end engageable with the valve seat;
    an annular spring support disposed around the rod and against the step of the longitudinal bore;
    a spring disposed about the rod and extending between the armature and the spring support biasing the armature toward the closed end of the actuator sleeve normally maintaining the spherical end spaced away from the valve seat; and
    a valve sleeve positioned in the longitudinal bore near the valve seat having a longitudinal hole communicating with the longitudinal bore, a cross hole communicating with the cross bore, an external end groove communicating with the longitudinal hole and an external longitudinal groove communicating with the end groove;
    wherein the rod extends into the longitudinal hole and includes an annular edge with a segment of reduced diameter between the annular edge and the parti-spherical end, the annular edge being disposable at various locations across the cross hole.

2. A solenoid valve according to claim 1 wherein the segment of reduced diameter is a turned down section of the rod.

3. A solenoid valve according to claim 2 wherein the turned down section of the rod is tapered down toward the parti-spherical end.

4. A solenoid valve according to claim 1 wherein the cross hole is a slot disposed normal to the longitudinal hole.

5. A solenoid valve according to claim 1 further comprising a second spring positioned around the rod and extending between the spring support and the valve sleeve.

6. A solenoid valve according to claim 1 wherein the housing includes a second end opposite the annular end with an annular groove near the second end and further comprising a check valve seal carried in the annular groove.

* * * * *